(12) United States Patent
Dejon et al.

(10) Patent No.: US 8,369,588 B2
(45) Date of Patent: Feb. 5, 2013

(54) METHOD AND APPARATUS FOR REGISTERING AT LEAST THREE DIFFERENT IMAGE DATA RECORDS FOR AN OBJECT

(75) Inventors: Andreas Dejon, Erlangen (DE); Lutz Gündel, Erlangen (DE); Friedrich Knoth, Herzogenaurach (DE); Michael Sühling, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 1143 days.

(21) Appl. No.: 12/003,895

(22) Filed: Jan. 3, 2008

(65) Prior Publication Data

US 2008/0181474 A1 Jul. 31, 2008

(30) Foreign Application Priority Data

Jan. 4, 2007 (DE) .......................... 10 2007 001 116

(51) Int. Cl.
*G06K 9/00* (2006.01)
(52) U.S. Cl. .......................... 382/128; 382/131; 345/629
(58) Field of Classification Search .................. 328/128, 328/294; 128/922; 382/131; 345/629, 634, 345/637
See application file for complete search history.

(56) References Cited

U.S. PATENT DOCUMENTS

| | | | | |
|---|---|---|---|---|
| 6,424,752 B1 * | 7/2002 | Katayama et al. | ............ | 382/284 |
| 6,904,184 B1 * | 6/2005 | Taylor | ............ | 382/294 |
| 7,010,080 B2 * | 3/2006 | Mitschke et al. | ............ | 378/8 |
| 7,366,360 B2 * | 4/2008 | Takiguchi et al. | ............ | 382/284 |
| 7,693,563 B2 * | 4/2010 | Suresh et al. | ............ | 600/407 |
| 7,701,626 B2 * | 4/2010 | Inuiya | ............ | 358/540 |
| 7,756,304 B2 * | 7/2010 | Hossack et al. | ............ | 382/128 |
| 7,948,503 B2 * | 5/2011 | Shekhar et al. | ............ | 345/648 |
| 2004/0071325 A1 * | 4/2004 | Declerck et al. | ............ | 382/128 |
| 2005/0152618 A1 * | 7/2005 | Takahashi | ............ | 382/294 |
| 2006/0215889 A1 * | 9/2006 | Omi et al. | ............ | 382/128 |
| 2006/0275745 A1 * | 12/2006 | Schwarz | ............ | 435/4 |
| 2007/0031063 A1 * | 2/2007 | Zhou | ............ | 382/284 |
| 2007/0104356 A1 * | 5/2007 | Zhang | ............ | 382/131 |
| 2007/0172112 A1 * | 7/2007 | Paley et al. | ............ | 382/154 |
| 2007/0237295 A1 * | 10/2007 | Gundel | ............ | 378/62 |
| 2007/0237422 A1 * | 10/2007 | Zhou et al. | ............ | 382/284 |
| 2007/0280556 A1 * | 12/2007 | Mullick et al. | ............ | 382/294 |

(Continued)

FOREIGN PATENT DOCUMENTS

DE 10322738 A1 12/2004

*Primary Examiner* — David A Vanore
*Assistant Examiner* — Wyatt Stoffa
(74) *Attorney, Agent, or Firm* — Harness, Dickey & Pierce, P.L.C.

(57) ABSTRACT

A method and an apparatus are disclosed for registering at least three different image data records for an object. In at least one embodiment, the method involves first of all determining for each image data record the anatomical region which is covered by the image data record. Next, degrees of overlap in these anatomical regions are calculated. These degrees of overlap are taken as a basis for determining the image data record as a master image data record which, in total, has a maximum overlap with the other image data records, ignoring degrees of overlap which are below a prescribable lower threshold. The other image data records are then registered merely with the master image data record. Thus, they are automatically also indirectly registered with one another. At least one embodiment of the present method and the associated apparatus reduce the waiting time for the user who wishes to visualize a plurality of the image data records simultaneously next to one another or superimposed on one another.

20 Claims, 2 Drawing Sheets

U.S. PATENT DOCUMENTS

| | | | |
|---|---|---|---|
| 2008/0080788 A1* | 4/2008 | Nord et al. | 382/294 |
| 2008/0089566 A1* | 4/2008 | Node-Langlois et al. | 382/128 |
| 2008/0143745 A1* | 6/2008 | Jin et al. | 345/629 |
| 2008/0181470 A1* | 7/2008 | Camus et al. | 382/128 |
| 2009/0030302 A1* | 1/2009 | Taniguchi et al. | 600/410 |
| 2011/0110569 A1* | 5/2011 | Weng et al. | 382/128 |

* cited by examiner

METHOD AND APPARATUS FOR REGISTERING AT LEAST THREE DIFFERENT IMAGE DATA RECORDS FOR AN OBJECT

PRIORITY STATEMENT

The present application hereby claims priority under 35 U.S.C. §119 on German patent application number DE 10 2007 001 116.6 filed Jan. 4, 2007, the entire contents of which is hereby incorporated herein by reference.

FIELD

Embodiments of the present invention generally relate to a method and an apparatus for registering at least three different image data records for an object which has an anatomy; for example for registering medical image data records which cover inexactly matching anatomical regions of the object.

BACKGROUND

When processing medical image data, it is frequently necessary to compare two or more image data records for a patient with one another which have been measured in the same period on different imaging modalities, on the same imaging modality in the same period but with different parameters, or on the same imaging modality in different periods. By way of example, this relates to applications in which a patient has been successively examined both using PET (Positron Emission Tomography) and using CT (Computer Tomography), which means that both PET and CT image data records are available. Other examples are different pervasions of contrast agent in the organs in the case of image recording using CT, in which case at least two image data records with different contrast agent distributions in the organs are obtained, or follow-up examinations where the patient is examined at a relatively long interval time using not necessarily identical recording parameters.

In all cases, it is desirable to compare the different image data records as well as possible. In principle, comparison is possible by fusing two image data records, by parallel visualization in the case of almost identical anatomies or by combining an anatomical image and an image of physiological processes (as in the case of PET and CT image data) in the data records or by navigating to a position in the second image data record which is selected in a first image data record. However, the image data records will generally not contain any identical anatomies. Changes in the position of the organs, changes in the patient position for the image recording or weight changes in the patient between recordings mean that simple association on the basis of coordinates is not possible.

To avoid these problems, registration methods are known which use a rigid or nonrigid registration technique. These first of all involve searching the image data records for identical structures, for example. Next, these identical structures are taken as a basis for calculating transformation matrices which map every voxel in the structures of one data record onto a voxel in the corresponding structures in the second data record. The transformations are then generalized for the whole data record.

When there are more than two image data records, the image data records are at present respectively registered in pairs. With large volumes of data, this results in long waiting times for the user on account of the high computation complexity for registration. Thus, in the case of a polyphase examination of the liver, for example, a native CT scan, i.e. a scan without contrast agent, is first of all performed. Next, the pervasion of the contrast agent in the liver artery, in the portal vein and in the liver parenchyma is examined. This results in four image data records and hence six pairs which are respectively registered with one another.

SUMMARY

In at least one embodiment, the present invention specifies a method and/or an apparatus for registering at least three different image data records which reduce the waiting time for the user before simultaneous visualization of at least two respective instances of the image data records.

In the proposed method of at least one embodiment, which is performed automatically by an apparatus which is appropriately set up for this purpose, for each of the image data records an anatomical region is first of all ascertained which is covered by the image data record. Next, degrees of overlap between the ascertained anatomical regions of the image data records are calculated. The calculated degrees of overlap are taken as a basis for determining a master image data record for which the total of the degrees of overlap with the other image data records is at a maximum, ignoring degrees of overlap which are below a prescribable lower threshold. In this case, the lower threshold is preferably stipulated in a range of degrees of overlap which is between 20% and 30%.

Next, all (remaining) image data records are registered with this master image data record. In this context, depending on the type of image data records, the registration method used may be any of the registration techniques which are known from the prior art. Registering all the image data records with the master image data record indirectly also registers these image data records with one another. The respectively required transformation matrix can easily be derived from the transformation matrices for registration of the respective image data records with the master image data record.

This results in less complexity for registering the image data records than when all image data records are registered with one another in pairs, as previously. Thus, when there are four different image data records, it is now only necessary to perform three complex registration procedures. The remaining registrations can easily be derived therefrom with little time and computation involvement. This practice therefore reduces the waiting time for the user before he can select and display the image data records to be simultaneously visualized.

The image data records, preferably 3D image data records, are recorded using an imaging tomographic modality. This may be a computer tomograph, a magnetic resonance tomograph or a positron emission tomograph, for example.

Preferably, in the case of medical image data records, the anatomical regions covered by the image data records are determined using the DICOM data. The DICOM standard is used for producing and further processing medical image data and results in image data records which contain supplementary information about the recording parameters in a data range. From this supplementary information, which is usually in the DICOM header, it is possible to read the anatomical region covered by the image data. The user does not need to load all the image data to do so.

In one refinement of at least one embodiment of the method, the user is only allowed to simultaneously visualize two or more image data records if these image data records have a sufficiently large degree of overlap in the anatomical regions which they cover. In this regard, use is preferably made of the lower threshold which is used for determining the master image data record. If the image data records to be visualized do not show a relatively high degree of overlap then a user cannot simultaneously visualize these image data records.

When registering data records containing regions which do not overlap completely, registration in nonoverlapping subregions may result in errors which the user is not immediately able to see in the images. In another very advantageous development of the method, when simultaneously visualizing two or more image data records, the user is therefore presented only with those image regions of the respective image data records which all the image data records which are to be simultaneously shown contain in an image quality which is suitable for evaluation. All other anatomical regions are darkened or covered by a mask in the presentation of these image data records. As a result, the user is automatically shown only those regions for evaluation or diagnosis which can also be compared without error.

For the previously described registration, it is assumed that the different image data records have been recorded within a period in which there has been no significant change to the object. However, if two groups of such image data records are recorded in different periods between which it is not possible to preclude change to the object, at least one embodiment of the present method preferably involves a master image data record being determined for each of the two groups and the images in the respective group being registered with the relevant master image data record. If images in the different groups are meant to be visualized simultaneously, the two master image data records are registered with one another using a suitable registration method which allows a change to the object to be taken into account.

By way of example, this can be done using identical structures within the two master image data records, particularly also by way of a nonrigid registration technique. The use of suitable artificial markers to simplify registration is also naturally possible in this context. Registration of the two master image data records in turn means that the image data records in the two groups are already registered with one another indirectly. The requisite transformation matrices can therefore easily be calculated from the registrations of the image data records for the master image data records and the registration of the master image data records for one another (or from the associated transformation matrices for these registrations).

The apparatus of at least one embodiment, designed for performing the method of at least one embodiment, accordingly comprises a determination unit which ascertains, for each of the image data records, an anatomical region which is covered by the image data record in each case on the basis of a prescribed perspective, calculates degrees of overlap between the anatomical regions of the image data records and takes the degrees of overlap as a basis for determining from the image data records a master image data record for which the total of the degrees of overlap with the other image data records is at a maximum, ignoring degrees of overlap which are below a prescribable lower threshold.

The apparatus also comprises a registration unit which registers the other image data records with the master image data record on the basis of an available registration algorithm. In at least one embodiment, the apparatus also comprises a suitable visualization unit which prevents the simultaneous presentation of image data records with insufficiently overlapping anatomical regions and/or darkens or suitably masks the anatomical regions which are not present in all image data records when a plurality of image data records are presented simultaneously.

In one advantageous refinement of at least one embodiment, the registration unit is also designed such that for registering a plurality of groups of image data records for the object which have been recorded in different periods between which it is not possible to preclude change to the object it registers, for each group, the group's associated image data records with a master image data record determined for the group by the determination unit and then registers the master image data records with one another.

BRIEF DESCRIPTION OF THE DRAWINGS

The present method and the associated apparatus are subsequently explained briefly again below using an example embodiment in conjunction with the drawings, in which.

DETAILED DESCRIPTION OF THE EXAMPLE EMBODIMENTS

Figure 1:
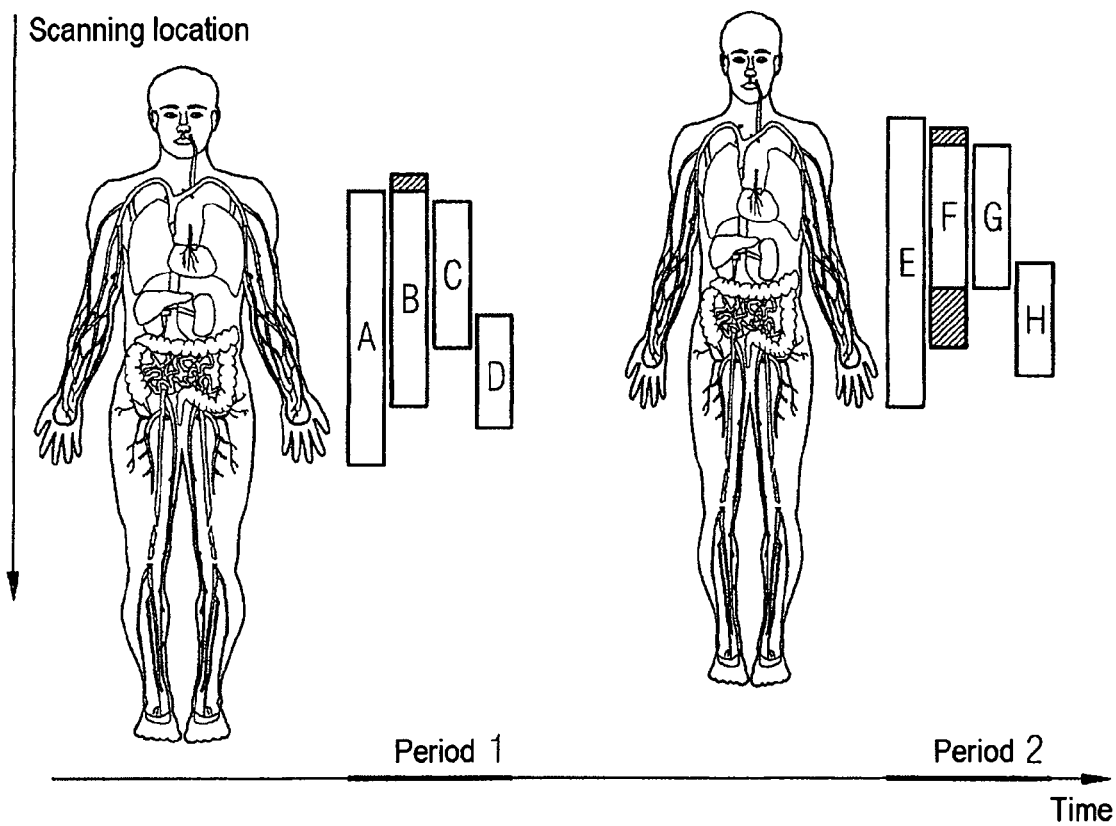
FIG. 1 shows an example of the practice with an embodiment of the proposed method.

The terminology used herein is for the purpose of describing particular embodiments only and is not intended to be limiting of the present invention. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referencing the drawings, wherein like reference numerals designate identical or corresponding parts throughout the several views, example embodiments of the present patent application are hereafter described. Like numbers refer to like elements throughout. As used herein, the terms "and/or" and "at least one of" include any and all combinations of one or more of the associated listed items.

The example embodiment below once again gives a more detailed explanation of the proposed method when examining a patient using computer tomography. In this case, in a first period (period 1), four examinations in the form of CT scans of different anatomical regions of the patient are performed which provide four different image data records A to D. Image data record A contains the neck, thorax, abdomen and pelvis. Image data record B covers a smaller region. It starts nearer the head, but the pelvis region is then missing. Image data record C contains the lungs and liver, and image data record D contains only the intestines. The scan regions of image data records A to D are indicated to the right of the patient.

An embodiment of the present method now first of all involves determining the anatomical regions indicated in the figure. These anatomical regions are read from the DICOM data for the four image data records. In this case, only slight anatomical differences in the data are assumed as a result of changes in position on the patients' couch or as a result of the patient's breathing. These anatomical regions are then taken as a basis for calculating the degree of overlap in the anatomical regions of the four image data records A to D. The result is shown by table 1 below.

TABLE 1

| overlaps | Data record | | | | Total > Threshold |
| --- | --- | --- | --- | --- | --- |
|  | A | B | C | D |  |
| A | x | 94% | 100% | 100% | 294% |
| B | 75% | x | 100% | 75% | 250% |
| C | 50% | 63% | x | 25% | 113% |
| D | 40% | 38% | 20% | x | 78% |
| Threshold |  | 30% |  |  |  |

Table 1 shows what overlaps there are in the anatomical regions of the four image data records. Image data records B, C and D overlap data record A by 94%, 100% and 100%. The overlap regions of data records C and D of 20% and 25%, respectively, are below a lower threshold value of 30% which is prescribed here. Synchronous output makes no sense for this small overlap region and is therefore rejected by the system. These small degrees of overlap are also ignored in the subsequent totaling.

To determine the master image data record, the overlap regions which are above the lower threshold value are totaled row by row. This total is greatest for image data record A at 294%, i.e. data records B, C and D have a maximum overlap with image data record A. Image data record A is therefore defined as the master image data record. Next, this master image data record is registered with the other image data records B, C and D. Accordingly, the paired registrations B-A, C-A and D-A take place. Thus, image data records B and C can also be shown in sync, since they are indirectly registered with one another via image data record A.

Figure 2:
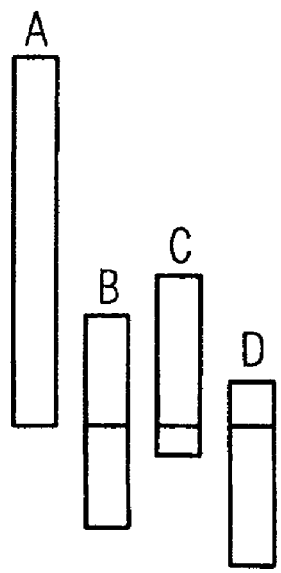
FIG. 2 shows another example with circumstances which have changed from FIG. 1.

Another example is shown briefly in FIG. 2 and in table 2 below. In this case, FIG. 2 merely shows the scan regions from four other CT scans which give image data records A to D. Data records B, C and D have an overlap of 50%, 80% and 20% with data record A in this case, as shown in table 2. For the totaling, data record D is then ignored in this row, since it is below the lower threshold of 30%. The row total of 130% is lower than the row total for data record B at 160%, however. Hence, in this further example, data record B is defined as the master image data record with which the other image data records are registered.

TABLE 2

| overlaps | Data record | | | | Total > Threshold |
| --- | --- | --- | --- | --- | --- |
|  | A | B | C | D |  |
| A | x | 50% | 80% | 20% | 130% |
| B | 30% | x | 80% | 80% | 160% |
| C | 40% | 67% | x | 40% | 147% |
| D | 10% | 67% | 40% | x | 107% |
| Threshold |  | 30% |  |  |  |

FIG. 1 also shows the situation for a further examination in a later period (period 2) in which the patient's position and the patient's weight have changed from period 1. This is indicated in FIG. 1 by the position having moved and by the patient having a thinner cross section. For image data records E to H, recorded in this later period, the degrees of overlap are in the same way taken as a basis for determining a master image data record, in this case image data record E. Registration then takes place between the pairs E-F, E-G and E-H. On the basis of the only slight overlap for image data records G and H, simultaneous joint presentation of these image data records, if the user inputs this on an operating console for the imaging system, is prevented.

Data records F and G do not overlap completely. Synchronous presentation next to one another can take place only in the light regions in FIG. 1. For the dark region of image data record F, there is no counterpart in image data record G. In this case, the screen is darkened for the joint presentation of these two image data records, which means that the user cannot identify this region from the outset.

An embodiment of the proposed method accordingly allows simple implementation of registration of image data records within a period in which the patient's position and shape changes only insignificantly. Synchronous output of image data records A and F, for example, requires additional method steps. To this end, the two master data records A and B are first of all registered. Invariable anatomies, such as bones, are used to determine the different position on the patients' couch and this is used to determine the different DICOM coordinate systems between period 1 and period 2. This is used to determine the overlap regions between the master data records, and the already available results within the individual periods are used to determine the overlap regions between all the image data records.

As an alternative to using invariable anatomies for determination, it is also possible to use artificial markers which are respectively attached to the same point on the body and can be detected in the images. The synchronous output, for example of image data records B and F, is derived from the registration for their respective master image data record A-B or E-F and the registration between the master image data records A and E.

Determination of the overlap regions for the image data records in a period is essentially based on the information from the DICOM header and can accordingly be displayed to the user in advance without the need to load the image data themselves. This determination takes place in a determination unit 2 in the proposed apparatus 1, which is indicated schematically in FIG. 3.

By way of example, the apparatus may be a computer with appropriate software modules. The determination unit 2 also determines the master image data record. The individual image data records from a period are registered with the master image data record by means of the registration unit 3, which to this end has access to one or more registration algorithms. Determining the overlap regions between two or more periods requires registration of the master image data records, which can be performed in the background in advance. It is thus also possible to display this information to the user before he selects the data for medical application and loads them into the relevant software for image display.

Figure 3:
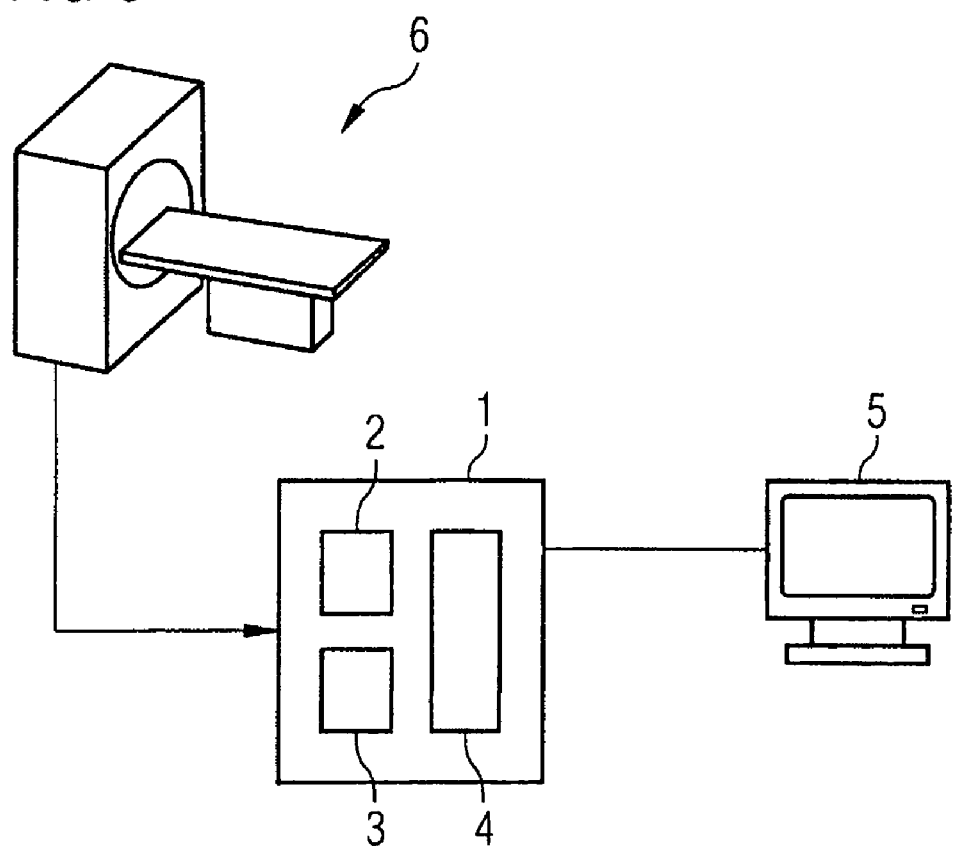
FIG. 3 shows a schematic illustration of an embodiment of the proposed apparatus.

FIG. 3 also shows the visualization unit 4 used to control the simultaneous visualization of a plurality of image data records on a monitor 5. In this example, the image data records are obtained from a computer tomograph 6 which is used to perform the examinations.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDS; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for registering at least three image data records for an object which has an anatomy, the method comprising:
   ascertaining, by an image data record registration apparatus, for each of the image data records, an anatomical region covered by the image data record;
   calculating, by the image data record registration apparatus, degrees of overlap between the ascertained anatomical regions of the image data records, the degrees of overlap being indicative of an amount of the ascertained anatomical regions that are common between the image data records;
   determining, by the image data record registration apparatus, from the image data records, using the calculated degrees of overlap as a basis, a master image data record for which a total of the degrees of overlap with the other image data records is at a maximum, ignoring degrees of overlap which are below a lower threshold; and
   registering, by the image data record registration apparatus, the other image data records with the determined master image data record.

2. The method as claimed in claim 1, wherein the registration of medical image data records involves the anatomical regions and degrees of overlap being determined from DICOM data for the image data records.

3. The method as claimed in claim 1, wherein simultaneous visualization of at least two respective instances of the image data records following registration is made possible only if the degree of overlap in the image data records to be simultaneously visualized is above the lower threshold.

4. The method as claimed in claim 1, wherein simultaneous visualization of at least two respective instances of the image data records following registration involves anatomical regions, which are not present in all of the image data records to be simultaneously visualized, being at least one of darkened and masked in the image presentation of the image data records.

5. The method as claimed in claim 1, wherein, for registering a plurality of groups of image data records for the object which have been recorded in different periods between which it is not possible to preclude change to the object, a master image data record is reflectively determined for each group and then the master image data records are registered with one another.

6. The method as claimed in claim 5, wherein the master image data records are registered by at least one of using artificial markers in the master image data records and matching anatomical features in the master image data records.

7. The method as claimed in claim 1, wherein registration is effected using a rigid registration algorithm.

8. The method as claimed in claim 1, wherein registration is effected using a nonrigid registration algorithm.

9. An apparatus for registering at least three image data records for an object which has an anatomy, comprising:
   a determination unit to ascertain, for each of the image data records, an anatomical region covered by the image data record, and to calculate degrees of overlap between the anatomical regions of the image data records, and to determine from the image data records, taking the degrees of overlap as a basis, a master image data record for which the total of the degrees of overlap with the other image data records is at a maximum, ignoring degrees of overlap which are below a lower threshold, the degrees of overlap being indicative of an amount of the ascertained anatomical regions that are common between the image data records; and a registration unit to register the other image data records with the master image data record.

10. The apparatus as claimed in claim 9, wherein the determination unit registers medical image data records by determining the anatomical regions and degrees of overlap from DICOM data for the image data records.

11. The apparatus as claimed in claim 9, further comprising a visualization unit to simultaneously visualize at least two respective instances of the image data records following registration, which presents the image data records as images in an identical perspective next to one another or superimposed on one another on an image display unit.

12. The apparatus as claimed in claim 11, wherein the visualization unit is designed to allow simultaneous visualization only if the degree of overlap in the image data records to be simultaneously visualized is above the lower threshold.

13. The apparatus as claimed in claim 11, wherein the visualization unit is designed to at least one of, when visualizing the image data records to be simultaneously visualized, darken and mask anatomical regions which are not present in all the image data records to be simultaneously visualized in the image presentation of the image data records.

14. The apparatus as claimed in claim 9, wherein the registration unit is designed such that to register a plurality of groups of image data records for the object which have been recorded in different periods, between which it is not possible to preclude change to the object, the registration unit registers, for each group, the group's associated image data records with a master image data record determined for the group by the determination unit and then registers the master image data records with one another.

15. The apparatus as claimed in claim 9, wherein the registration unit is designed to perform registration using a rigid registration algorithm.

16. The apparatus as claimed in claim 9, wherein the registration unit is designed to perform registration using a non-rigid registration algorithm.

17. The method as claimed in claim 2, wherein simultaneous visualization of at least two respective instances of the image data records following registration is made possible only if the degree of overlap in the image data records to be simultaneously visualized is above the lower threshold.

18. A tangible computer readable medium including program segments for, when executed on a computer device, causing the computer device to implement the method of claim 1.

19. The apparatus as claimed in claim 10, further comprising a visualization unit to simultaneously visualize at least two respective instances of the image data records following registration, which presents the image data records as images in an identical perspective next to one another or superimposed on one another on an image display unit.

20. An apparatus for registering at least three image data records for an object which has an anatomy, the apparatus comprising:
   means for ascertaining, for each of the image data records, an anatomical region covered by the image data record;
   means for calculating degrees of overlap between the ascertained anatomical regions of the image data records, the degrees of overlap being indicative of an amount of the ascertained anatomical regions that are common between the image data records;
   means for determining from the image data records, using the calculated degrees of overlap as a basis, a master image data record for which a total of the degrees of overlap with the other image data records is at a maximum, ignoring degrees of overlap which are below a lower threshold; and
   means for registering the other image data records with the determined master image data record.

* * * * *

UNITED STATES PATENT AND TRADEMARK OFFICE
CERTIFICATE OF CORRECTION

| | | |
|---|---|---|
| PATENT NO. | : 8,369,588 B2 | Page 1 of 1 |
| APPLICATION NO. | : 12/003895 | |
| DATED | : February 5, 2013 | |
| INVENTOR(S) | : Dejon et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1279 days.

Signed and Sealed this
Thirtieth Day of December, 2014

Michelle K. Lee
*Deputy Director of the United States Patent and Trademark Office*